United States Patent [19]

Kanitz et al.

[11] 3,831,091

[45] Aug. 20, 1974

[54] DATA COMMUNICATION SYSTEM

[75] Inventors: Bruce R. Kanitz, Fairport; Virgil H. Koning, Henrietta; Charles L. Jacobson, Pittsford, all of N.Y.

[73] Assignee: Xerox Corporation, Rochester, N.Y.

[22] Filed: May 16, 1972

[21] Appl. No.: 253,727

[52] U.S. Cl. ............................ 325/18, 178/6, 179/4, 325/64

[51] Int. Cl. ............................ H04b 1/40

[58] Field of Search ............ 325/15, 64, 21, 22, 18; 343/176–189; 179/2 TV, 4; 178/69.5 F, DIG. 3, 6

[56] References Cited

UNITED STATES PATENTS

| | | | |
|---|---|---|---|
| 2,742,526 | 4/1956 | Ridings | 178/69.5 F |
| 3,006,999 | 10/1961 | Mason | 179/4 |
| 3,432,613 | 3/1969 | Saeger et al. | 178/6 |
| 3,441,665 | 4/1969 | Wuensch | 178/6 |
| 3,646,256 | 2/1972 | Jacob et al. | 178/DIG. 3 |

*Primary Examiner*—Robert L. Griffin
*Assistant Examiner*—Marc E. Bookbinder

[57] ABSTRACT

A transceiver unit employing a time sharable circuit for performing two functions, the first of the functions operable during the send mode of the transceiver, the next function operable during the receive mode of the transceiver. In the send mode, the circuit responds to a proper receiver ready signal to activate the transmission. By proper filtering the circuit distinguishes over noise. In the receive mode, the circuit responds to the initial portion of the transmitting signal for determining the proper receiver speed. The circuit includes a filter, a voltage window detector responsive to a frequency band represented by a voltage range, and two detection circuits. The first detection circuit is provided with delay time sufficient to insure receipt of a valid ready signal when in the send mode and a lesser delay time to assure a valid receipt of a transmitted speed select signal when in the receive-speed select mode. A second detection circuit is gated from the voltage window detector to detect a different speed select signal transmission indicating a different speed. Logic circuitry is coupled to the decoded speed indicating signals as a means of further decoding, interpreting and determining transmitted speed information in the unit.

39 Claims, 5 Drawing Figures

PATENTED AUG 20 1974 3,831,091

SHEET 3 OF 3

DATA COMMUNICATION SYSTEM

This invention relates to transceiver units and more particularly to a time sharable circuit within the transceiver unit for indicating receipt of a ready signal from a remote receiver and a speed of transmission signal from a remote transmitter.

In data communication systems and in facsimile transmission systems in particular, it is necessary that a transceiver unit, when acting in the transmit mode, be provided with an accurate indication that the receiver unit is ready to receive a signal. It is a further necessity that the transceiver unit, when in a receive mode, be provided with a suitable means for determining the speed of the transmission unit carriage so as to properly synchronize the speed of the receiver carriage with receipt of the data communicated. The form of data communication device envisioned within the concept of the present invention relates specifically to the type employing transmission of data signals such as over telephone lines and the like. Within this framework, available bandwidth, noise, and other such limitations must be taken into account in designing a suitable and effective system.

In facsimile transceiver systems, operation is accomplished by scanning documents at a transmit station, developing an electrical signal representative of the contents of the document, and using this signal to modulate a carrier in a form suitable for transmission over standard telephone transmission lines. These signals are referred to as "baseband" signals. One form of modulation using such baseband signals is frequency modulation at a low frequency in the audio range transmissible by ordinary telephone circuitry. This frequency is normally in the range of 1,500 to 2,500 Hz. During transmission, the frequency modulated signal is coupled into a standard telephone transmission line directly or by means of an acoustic coupler or similar type device and removed from the transmission line by a complimentary type device at the receiving station. By use of frequency or amplitude modulated signals, acoustic couplers in conjunction with telephone line devices may be employed without any special electrical requirements at the interface. At the receiving station the frequency modulated signal is demodulated to provide an electrical signal that can operate a suitable printing device. In the satisfactory operation of such a system, it is necessary to provide some means of assuring that both transmit and receive functions can be performed. With regard to the present invention, two specific requirements are necessary. First, it is necessary that a transceiver unit when in the transmit mode be provided with a signal indicating that the receiver unit is ready to receive. Secondly, it is necessary that a transceiver unit when operating in the receive mode possess the capability of detecting a signal transmitted by the transmitter for indicating to the receiver the speed of document processing transmission. The receiver can respond to the transmitted signal for adjusting its own speed in order to synchronize the reproduction capacity of the receiver unit with receipt of the transmitted signal.

Document assurance in transceiver equipment is sometimes referred to as "handshaking." This operation is the interchange of signals between a receiving unit and a sending unit prior to transmission, and the electronic processing of these signals to allow the sending unit to begin transmission only when a "ready" receive machine is connected. This is accomplished by detecting the specific frequency and duration of the receive units' "ready-tone." The sender listens for this ready tone only when it is ready to transmit, i.e., when it has successfully loaded an original document, a handset is in the coupler, and a connected unit is "off hook." At the time it is ready to listen the sender is transmitting an intermittent tone. Obviously, if any receive machine transmits a different frequency or short duration "ready tone" or which transmits a valid "ready tone" when the sending machine is not ready to send, the "handshaking" will not be accomplished and the sender will not begin transmission. Automatic speed selection is the ability of a receive machine to adjust its carriage speed to correspond to that of the transmitting machine. This is accomplished by detecting a speed identification signal from the sending machine during the early part of the transmission.

It is therefore a prime object of the present invention to provide a transceiver unit with a novel and unique circuit for detecting and verifying a receiver ready signal when the transceiver is acting in the transmit mode.

It is a further object of the present invention to provide a novel and unique transceiver circuit for detecting a receiver ready signal when the transceiver is acting in a transmit mode with provision for disregarding false noise sources such as produced by telephone line connections, accoustical background, and the like.

It is a still further object of the present invention to provide a transceiver unit employing speed select circuitry acting in response to a signal received from a remote sender when the transceiver unit is acting in its receive mode to automatically select a response speed in order to synchronize with the transmission.

It is another object of the present invention to provide a single circuit for accomplishing both receiver ready detect and speed select control by use of time sharing technique.

The foregoing objects of the invention are accomplished by means of a circuit in a transceiver unit which can operate to perform two functions: First, in the send mode the circuit can respond to a proper receiver ready signal which is sent to activate the transmission. By proper filtering, the circuit can distinguish over noise. In addition, by providing proper time delay components, based on what is considered to be a suitable duration taking into account environmental considerations, the circuit can be made to distinguish over noise. In the receive mode, the same circuit in conjunction with additional logic circuitry responds to the initial portion of the transmission signal for determining the proper receiver speed.

In more detail, the transceiver circuit is designed with a filter, a voltage window detector responsive to a frequency band represented by a voltage range, and two detection circuits. One of the detection circuits is provided with delay time sufficient to insure receipt of a valid ready signal when the transceiver circuit is in the send mode. A send mode or receive mode signal is applied to the transceiver circuit to provide an indication of the transceiver's mode of operation. The delay circuit includes a lesser delay time which is operative in response to a receive mode signal applied thereto to assure valid receipt of an information signal during the receive mode for speed selection. In the receive mode, a second speed selection circuit is provided which is gated from the voltage window detector for detecting a signal indicating a different speed of operation. The speed of operation is indicated by means of supplying two different frequency signals. Each frequency signal is converted into a voltage, the voltage compared with the voltage window of the voltage window detector, and the appropriate output energized. A logic circuit including a plurality of counters operating over a fixed cycle is employed to energize the appropriate components for initiating the proper speed selection, and to provide additional time delay function.

The foregoing objects and brief discussion will become more apparent from the following more detailed description when taken in conjunction with the appended drawings wherein.

Figure 1:
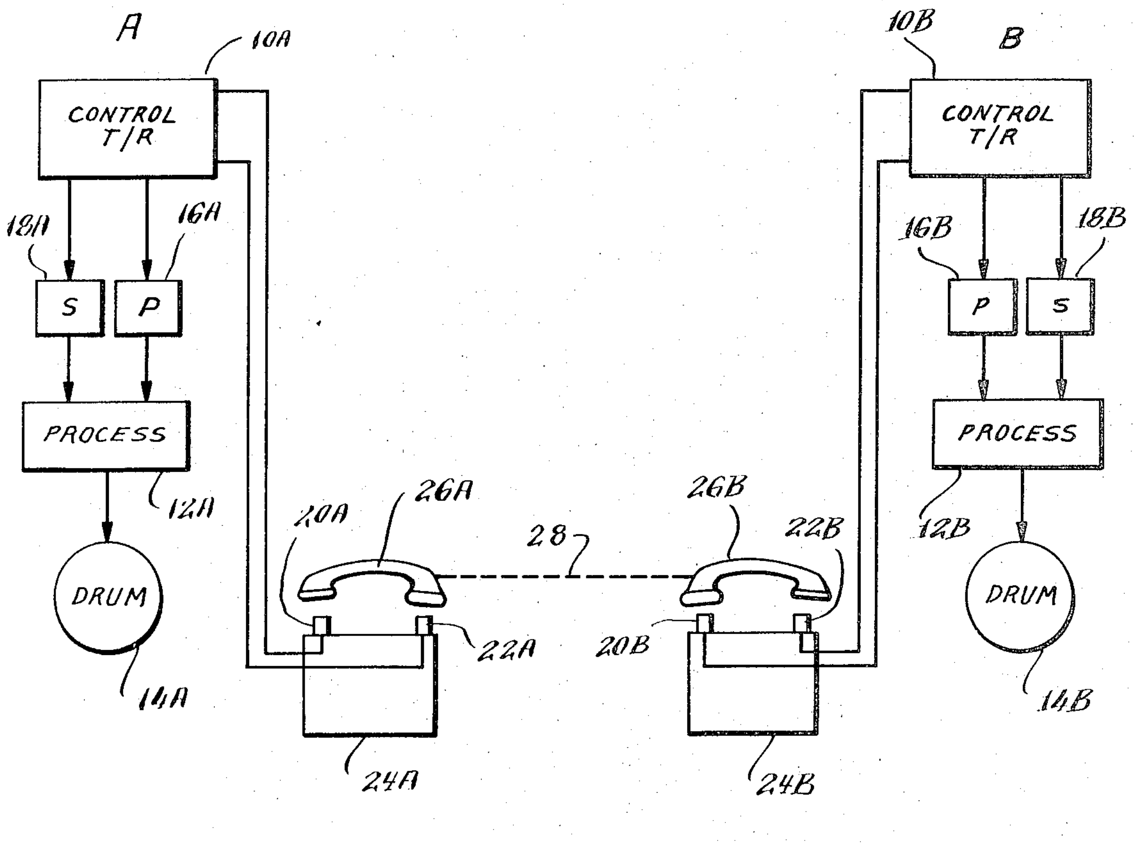
FIG. 1 is a generalized block diagram of a transceiver system such as is contemplated within the scope of the present invention.

Referring now to FIG. 1, a brief description of the system with which the invention finds particularly utility is illustrated. Within the generalized framework of the present invention a suitable transceiver system is shown in FIG. 1 with a first unit located at remote position A and a second unit located at a further remote position B. Each of the transceiver units as shown are identical, each capable of transmitting or receiving a signal in accordance with the desired operation. Since the units shown under A and B in FIG. 1 are intended to be identical for purposes of this description, like reference numerals will be used to refer to like components with only the reference numeral subscripts delineating the distinction between unit A and B. Thus, in FIG. 1, a control unit 10 is illustrated as interacting with a processing unit 12 which coacts in turn with a processing drum 14 through print unit 16 and scan unit 18. The control unit 10 is in turn coupled to appropriate transducers 20 and 22 which form part of an acoustic coupling unit 24. The acoustic coupling unit 24 transceives appropriate signals to a data handset 26 which may be of a conventional audio telephone line, which in turn transmits signals over a transmission line 28 to the desired remote unit.

In operation, assuming unit A transmitting and unit B receiving, an appropriate control signal is entered into the control unit 10A and an initial signal such as an interrupted tone is transmitted through the transducer 20A, the handset 26A and the data transmission line 28 to the receiving unit. When the receiving unit is ready to receive, it will send to appropriate signal to the transmitting unit. In a ready condition, the receiving unit B transmits a ready signal and the information transfer is effected. Facsimile transceiver devices are described in further detail, for example, in the Saeger et al. U.S. Pat. No. 3,432,613, issued Mar. 11, 1969 and assigned to the assignee of the present invention.

As was discussed above the signal transmission is based upon a modulated signal. When a transceiver is operating in its send mode, the transceiver is transmitting an appropriate signal to the receiver unit prior to actual data transmission. The interrupted signal is designed to have an on period and an off period. The transceiving sending unit operates during the off period to detect the presence or absence of a ready signal from the remote receiver. The ready signal received from the remote receiver is in the nature of an audio frequency tone suitable for transmission over telephone lines. Thus, for example, a ready signal may consist of a 1,500 Hz tone which must be of such duration that it will equal or exceed any maximum expected noise duration. The reference to noise indicates that noise which falls within the bandwidth of interest.

Figure 2:
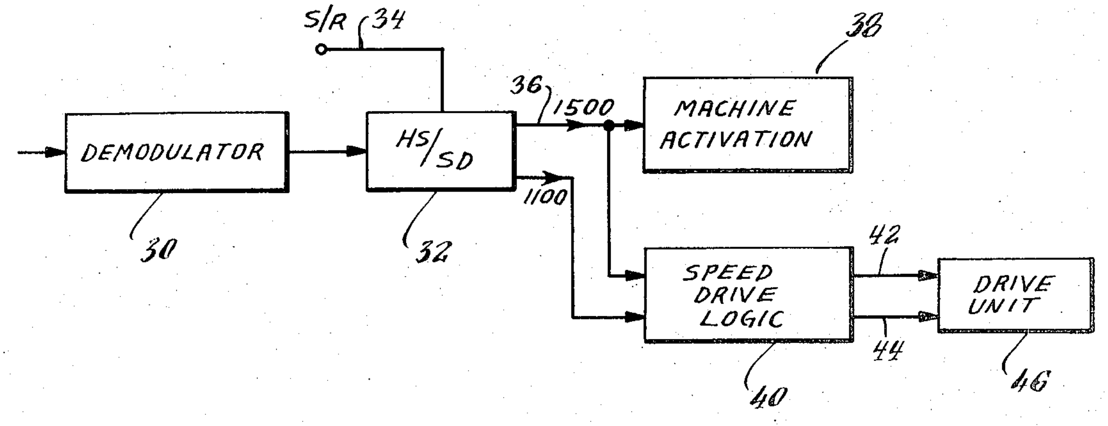
FIG. 2 is a generalized logic circuit illustrating the relative function of the components.

As was described above in either the send or receive mode the transceiver circuit of the present invention is designed to respond to signals received from the corresponding remote unit to perform a desired function. Referring now to FIG. 2 an input signal received by the local transceiver unit which may corrspond either to a ready tone (T) or a speed select signal (R) is received by a demodulator 30 which effectively translates the received signal to a DC level proportional to the received frequency. The DC level is coupled from the demodulator 30 to the transceiver circuit 32 which performs verification of a remote receiver ready signal or a partial speed verification based upon transmission from a remote sender unit. Complete speed verification is accomplished by the combination of circuit 32 and circuit 40. Send or receive mode is triggered by means of an appropriate send or receive signal coupled along the line 34 to the circuit unit 32. In the send mode, a signal appears along the line 36 indicating verification of a receiver ready signal which in turn activates a suitable machine activation unit 38 for initiating the transmission of the send unit. Should the unit be in the receive mode, the incoming signals refer to speed select and are coupled to and effectively delayed through the appropriate speed drive logic 40 along the lines 42 and 44 which in turn activate a suitable drive unit 46 for carrying into effect the speed select in accordance with the control signals thus received.

Figures 3, 4:
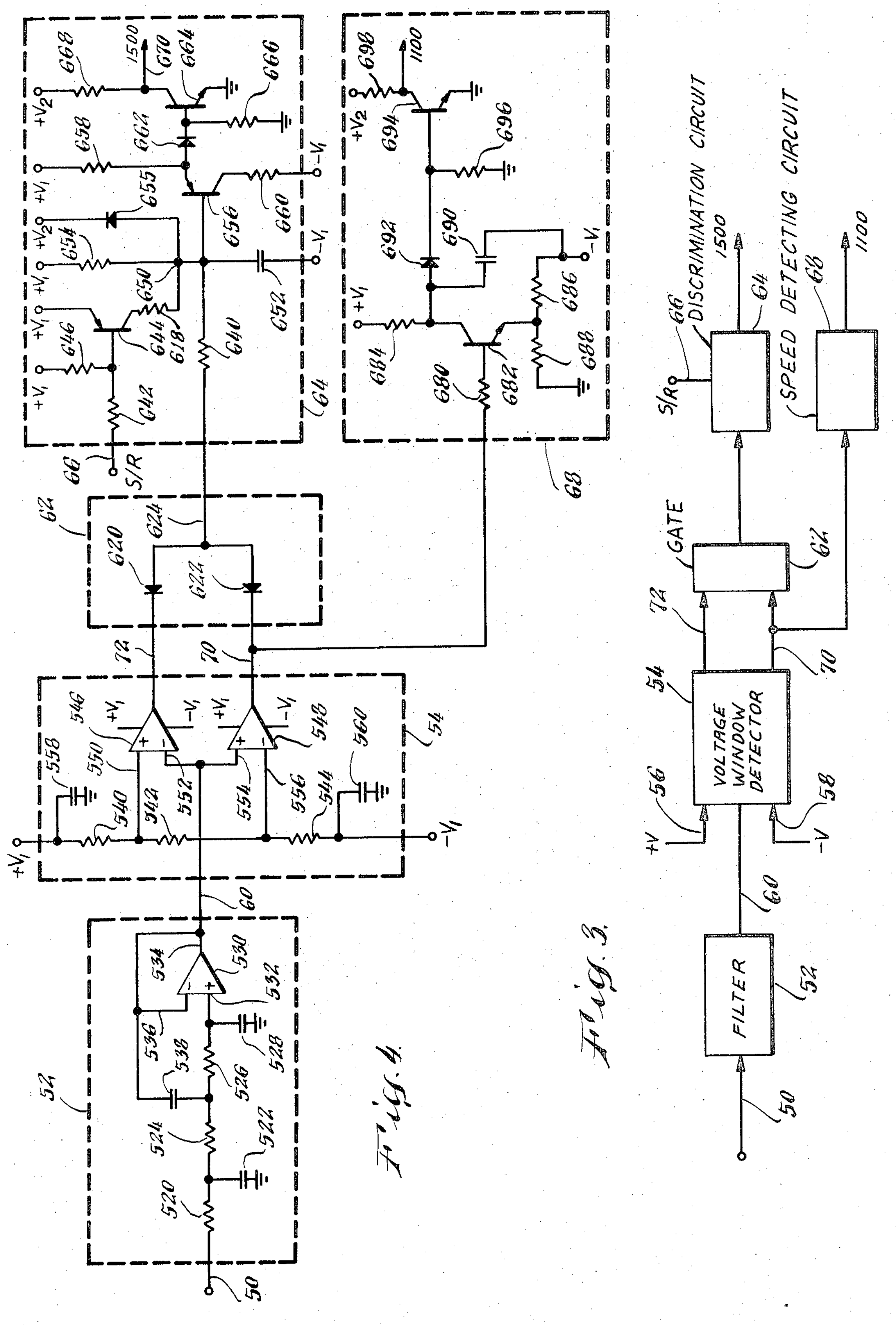
FIG. 3 is a schematic illustration of the functional relationships of the components forming the transceiver circuit.
FIG. 4 is a curcuit diagram of the components forming the transceiver circuit.

Referring now to FIG. 3, the transceiver circuit 32 is illustrated in greater detail. As shown, the input signal received from the demodulator unit 30 is coupled along a line 50 to an input filter 52. The output of the input filter 52 is coupled to a voltage window detector 54 having positive and negative voltage range limitations coupled into the terminals 56 and 58, respectively, by means of appropriate valued reference sources. The output of voltage window detector 54 is coupled through a gate 62 which is coupled in turn to a selective discrimination circuit 64 which serves with two delay functions sufficient to distinguish a received ready signal or a speed select signal from spurious input noises within the same bandwidth. A logic input 66 coupled to the circuit 64 provides an indication to the circuit 64 as to which of the send or receive modes the transceiver circuit 32 is operating and therefore dictates which time delay is appropriate. The output of the voltage window detector 54 is further coupled to a speed detecting circuit 68. This circuit is also equipped with a delay to distinguish over noise. The circuit 68 is designed for detecting a second frequency level signal indicating that a different speed signal is being transmitted and thereby in conjunction with the logic delay circuitry and control circuitry energizes the alternate speed of transceiver.

By way of simplifying design, the transceiver circuit 32 can be designed to accommodate the same frequency signal indicating receipt of a remote receiver's signal ready condition as would indicate one of the speed select signals from a remote transmitter. The receiver ready signal for the transceiver circuit operating in the send mode is also a voltage corresponding to a frequency level of 1,500 Hz. The present invention as illustrated shows the use of two speed select signals. The first of these signals is represented by a voltage to a frequency of 1,500 Hz, the second of these signals is represented by a voltage corresponding to a frequency of 1,100 Hz. It should be apparent that additional speed controls can be provided by the use of additional voltage corresponding frequencies, limited only by the bandwidth of transmission line and other factors incident within the data communication system employed.

The demodulated DC signal appearing along the line 50 is applied to the input filter 52 for purposes of smoothing and eliminating any ripple or other transient component appearing along the line 50 after the demodulation. As noted above, the DC voltage appearing along the output line of the filter 52 will correspond directly to the frequency level appearing at the input of the demodulator unit. The voltage window detector 54 is designed to have an upper and lower voltage limit. When the DC signal emerging from the filter unit 52 falls within the band set up by the two reference potentials appearing along the line 56 and 58, or thus falls within the window, the gating circuit 62 responds thereto and provides an appropriate signal level along the output from the gate 62 to the circuit 64. When the circuit 64 is in the send mode, the internal delay of the circuit 64 will prevent the appearance of an output signal until the prerequisite time period has passed during which the signal applied from the gate 62 to the circuit 64 continues. Loss of this signal at any time during the send mode will immediately reset the delay period of the circuit 64, thereby preventing initiation of a transmission. Thus, transmission will not be initiated without the requisite presence of a suitably time extended ready signal received from the remote receiving unit. Incidentally, any information signal not received for a sufficient duration will have a similar effect on operation.

The time delay of circuit 64 is set by means of an input supplied along the line 66. Receipt of a signal by the voltage window detector 54 which falls outside of the voltage window, either above or below, will result in either one or the other inputs to the gate 62 being effectively blocked. Thus, the unit 64 will not operate unless a properly received signal falls within the frame of the voltage window designed into the voltage window detector as received thereby.

When the local transceiver and the circuit 32 are operating in its receive mode condition, during the initial period of transmission, the demodulated input signal along the line 50 will include information relating to a characteristic of a remote transmission unit. Specifically the signal appearing along the line 50 during this initial transmission includes a signal portion referred to as the pushing signal and provides speed selection information indicating the transmitter speed. The phasing signal is smoothed through the input filter 52 and applied to the voltage window detector 54. The two signals chosen for purposes of speed selection in this embodiment are a 1,500 Hz signal, and an 1,100 Hz signal. The DC proportional to 1,500 Hz signal, as described before, will pass through the voltage window detector, activate the gate 62 when within the window, and generate through the circuit 64 an appropriate output signal along the 1,500 line indicating that a 1,500 Hz signal has been received. Appropriate machine activation is then effected after a number of these 1,500 line outputs through logic circuitry to be described in further detail below. Again, as before, the circuit 64 is provided with an indication of the operational mode by means of an appropriate signal applied along the line 66. Should the input signal represent the other speed selection frequency, that of the 1,100 Hz, the appropriate voltage applied to the voltage window detector will in this instance fall below the voltage window. In this case, the output line 70 of the voltage window detector 54 will be activated whereas the output line 72 of the voltage window detector 54 will not be activated. A circuit 68 responds to the activation along the line 70 to provide an appropriate output signal along the 1100 line indicating the particular frequency detected and the speed corresponding thereto. Again, appropriate logic circuitry responds to a number of these 1100 signals for activating the appropriate speed control, as will be described in further detail below.

Referring now to FIG. 4 a more detailed description of the circuit 32 is provided. Thus, in FIG. 4 the input filter 52 includes a filter configuration known as a Paynter filter which in this example is a low pass three pole filter having a corner frequency designed at 300 cycles. A Paynter filter has been chosen for this particular example because of its important excellent time domain response characteristics. Fast time domain response is necessary in order to follow the switching DC level associated with the phasing signal received when the unit is in its receive mode. The input signal on line 50 is smoothed by the filter to substantially attenuate any transient interference or ripple, and to present as steady a potential level as possible to the voltage window detector 54.

As shown in FIG. 4, the filter 52 includes an input resistor 520, a shunt capacitor 522, a set of series resistors 524 and 526 and a second shunt capacitor 528. The differential amplifier 530 receives the input from the filter along its first positive input terminal 532 and the output therefrom appears along the output line 534 and its feedback line to the second negative input terminal 536 and through a capacitor 538 to the junction point between the series resistors 524 and 526. The output of the filter unit, passing along line 60, is next coupled to the voltage window detector 54. The voltage window detector 54 includes a resistor string having resistances 540, 542 and 544 connected in series across a voltage supply provided by a first source +V1 and a second source −V1. The desired voltage range for the window is provided by adjusting the values of the resistances 540, 542, 544 such that the intermediate taps will result in the desired voltage points. These resistances may be fixed, as shown, or variable to permit fine adjustment of the window range. The voltage window detector 54 includes differential amplifiers 546 and 548, each having differential input terminals illustrated, respectively, as 550, 552, 554 and 556. Input terminal 550 is coupled to the junction of the resistors 540 and 542, input terminal 556 is coupled to the junctions between resistors 542 and 544, and the common connection between terminals 552 and 554 of the amplifiers 546 and 548 are commonly connected to the input line 60 of the voltage window detector 54. The operational amplifiers 546 and 548 are each powered by the power supply units +V1 and −V1 as illustrated. Ripple elimination capacitors 558 and 560, as indicated, couple the resistor string potential suppliers +V1 and −V1 to ground. The output lines 70 and 72 appearing from the voltage window detector 74 are coupled to the gating unit 62 which consists of first and second unilaterally conducting devices illustrated as the diodes 620 and 622. These diodes are coupled directly to the input lines 72 and 70, respectively. The output of the diodes is coupled along a line 624 to the discrimination circuit 64.

As illustrated, the discrimination circuit 64 includes a current limiting resistor 640 coupling the input signal from the gating unit 62 along the line 624. The send/receive mode signal line 66 is connected through a current limiting resistor 642 which is in turn connected to the base electrode of a transistor 644. Further biasing is supplied by a resistor 646 from a source of potential +V1 to the base of the transistor 644. The emitter electrode of the transistor 644 is shown as coupled to the source +V1. The collector electrode of the transistor 644 is connected through a resistance 648 to a common junction point 650. The resistance 648 acting with respect to the potential source +V1 forms an RC circuit, as will be explained in further detail below, along with capacitor 652 which is coupled between a source −V1 and the junction point 650. A further resistor 654 forms a second RC circuit between a source of potential +V1 in conjunction with the capacitor 652 to the second source of potential −V1. A unilateral conduction device, diode 655, is coupled between a source of potential +V2 and the common junction point 650. The signal appearing at the junction point 650 is coupled to the base electrode of a further transistor 656. The emitter electrode of transistor 656 is coupled through a current limiting resistance 658 to the potential source +V1. The collector electrode of transistor 656 is coupled through a current limiting resistor 660 to a suitable source of potential −V1. The emitter electrode of the transistor 656 is coupled through a diode 662 to the base electrode of a transistor 664, with a biasing resistor 666 coupling the base electrode of the transistor 664 to ground potential. The transistor 664 at its collector electrode is coupled to a potential source +V2 acting through a current limiting resistor 668, while its emitter electrode is coupled directly to ground. The output line 670 of the transistor 664 is taken from the collector electrode thereof and corresponds to the 1500 signal output.

The speed detecting circuit 68 as shown includes an input resistor 680 coupled to the output line 70 of the voltage window detector 54. The resistor 680 couples the output appearing on line 70 to the base electrode of a transistor 682. The transistor 682 has its collector electrode coupled to a source +V1 through a current limiting resistor 684. The emitter electrode of the transistor 682 is coupled by means of a resistor junction consisting of series connected resistors 686 and 688 from a source −V1 to ground potential. A further capacitor unit 690 forms an RC circuit with the resistor 684 in a manner which will be described in further detail below. The junction of the capacitor 690 an resistor 684 is coupled through a diode 692 to the base electrode of a transistor 694. A biasing resistor 696 couples the base electrode of the transistor 694 to ground. The collector electrode of the transistor 694 is coupled through a current limiting resistor 698 to a source +V2. The emitter electrode of the transistor 694 is coupled to ground. The 1100 output of the speed detecting circuit 68 is taken from the collector electrode of transistor 694 along an output line designated by the reference 1100.

Describing briefly the operation of FIG. 4, a demodulated signal appearing at the line 50 passes through the three pole Paynter filter 52 and is smoothed by the combination of resistor and capacitor networks shown in a well known manner. The filtered voltage appearing at the line 60 is introduced to complementary inputs of the differential amplifier 546 and 548 which receives as reference voltage levels the voltage appearing at the respective junctions of the resistor string formed between the voltages +V1 and −V1. The operation of the differential amplifiers is such that a voltage appearing along the line 60 which falls between the window defined as the spread between the two reference voltage levels applied to the input terminal 550 and 556 of the differential amplifiers 546 and 548 will result in a positive output voltage from both amplifiers 546 and 548. A voltage falling above the window will result in a positive voltage at the output of differential amplifier 548 and a negative voltage at the output of differential amplifier 546, a voltage appearing below the window will result in a negative voltage output at the differential amplifier 548 and a positive voltage output at the differential amplifier 546. A voltage that appears within the window resulting in a positive output from differential amplifiers 546 and 548 along lines 72 and 70 respectively will block conduction of diodes 620 and 622 in the gating unit 62. As a result of blocking of the diodes 620 and 622, a high impedance path is provided at the beginning of the line 624. Meanwhile, the circuit 64 has received an indication along the input terminal 66 as to whether the unit is in a send or receive mode. For example, if the unit is in a send mode a logic signal, i.e., one, will have been applied to the terminal 66 which will have the effect of presenting an open circuit thereon. If the terminal 66 represents an open circuit, indicating the unit to be in a send mode, transistor 644 will be biased to an off condition, thereby representing a high impedance path through the resistance 648. Thus the only impedance path presented for the junction point 650 will be through the resistance 654. The resistance 654 is provided with a relatively large value relative to the resistance 648. As a result, the capacitor 652 will begin to charge at a rate such that it will not reach an appropriate triggering level for a period of time determined by the maximum amount of noise forecast for the system. In the present example, a time delay of 100 milliseconds is assumed. The transistor stage 656 is arranged as an emitter follower circuit, and isolates the output stage from the charging circuit. At the end of the time delay period, the voltage of the junction point will have reached a sufficient level to cut off the transistor 656 and in turn apply a positive voltage to the base electrode of the transistor 664, and thus provide an output signal along the line 670 indicating the valid presence of 1,500 Hz signal.

In the speed select mode, and assuming receipt of a voltage level corresponding to a 1,500 Hz input, indicating one of the two speed levels to be selected, a logical 0 is applied to the terminal 66 which will have the effect of grounding that terminal. As a result, transistor 644 will be rendered in an on condition, and the charge path defined for capacitor 652 will be the RC circuit including capacitor 652 and the parallel connection of resistor 648 and 654. The resistor 648 will have a lower design impedance than the resistor 654. As a result, the voltage junction point 650 will reach the triggering level after a much shorter delay time. This time delay is designed to insure against detection of short noise pulses, transients or the like such as non-valid phasing pulse. The time delay serves the same function for speed select as it does for ready detection. The reason for the shorter time delay is based upon the nature of the speed select signal. The speed select signal is transmitted as pulses that may be as short as 12 milliseconds while the ready signal may be several seconds long. Further time delay is accomplished by the logic circuitry. In both of the foregoing described situations the diode 655 clamps the junction point 650 to a lower potential +V2 to prevent the capacitor from continuing to charge up to a maximum voltage level which may have the effect of destroying the transistor 656.

If the output voltage of the filter 52 falls above or below the window, the capacitor charging circuit will not be rendered effective, since a low impedance path will be formed along the input line 624 through one of the diodes 620 or 622. If a voltage corresponding to the 1,100 Hz input has been received by the filter unit 52 and applied along the line 60, it will result in a signal applied along the input resistor 680 to the crcuit 68 which will have the effect of turning off the transistor 682 which is held in a normally on condition. With the transistor 682 turned off, an RC charging path is provided composed of capacitor 690 and resistor 684 between the sources of potential +V1 and −V1. Again, the time delay involved in this charging circuit can take into effect an average condition of potential noise limitations. Upon reaching the proper charging level at the junction of capacitor 690 and resistor 684, a signal is passed through the diode 692 to the base electrode of transistor 694, rendering same conductive and allowing an output pulse to appear along the 1100 line.

Figure 5:
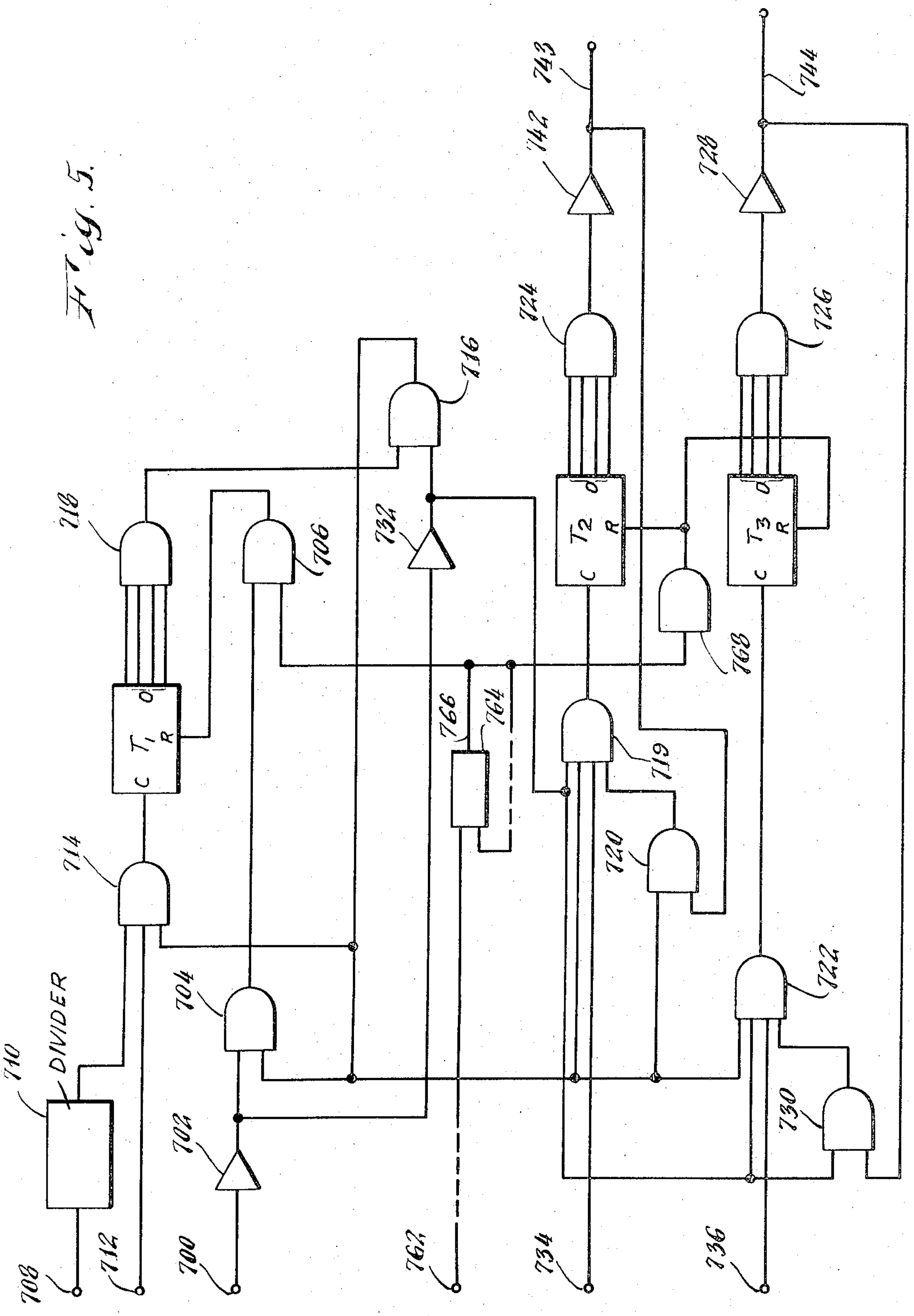
FIG. 5 is a logic diagram illustrating the manner wherein the transceiver circuit operates with the speed selection portion of the present invention.

Referring now to FIG. 5 there is illustrated that portion of the logic circuitry which is employed for providing the appropriate speed select signals in accordance with signal representations received from the circuit illustrated in FIG. 4.

As shown in FIG. 5, the counter units T1, T2 and T3 are employed simultaneously to perform the speed select function. Each of the counters includes a count input terminal C, a reset input terminal R and output terminals 0 from which the state of the counter may be derived. As explained in detail above, the transceiver unit is in its receive mode during the speed select operation. During the initial information transmission phasing period, detection of a carrier indicating the presence of an incoming signal and absent any fault conditions is supplied by means of a logical 1 along the terminal 700. This logic 1 is converted to a logical 0 through the inverter unit 702 and applied to a first input of gate 704. Unless otherwise indicated, each of the gates referred to in FIG. 5 is a logical NAND gate. A logical 0 at the input of gate 704 will result in a logical 1 at the output of gate 704 being coupled to an input of gate 706. The other input of gate 706 during this period is a logical 1. The output of gate 706 therefore is a logical 0 and is coupled in turn to the reset input of counter $T_1$. The counter T1 operates to reset upon receipt at its reset terminal of a logical 1.

System timing is controlled by a standard 60 Hz waveform along input line 708 to a clock device 710. The clock device 710 divides the input frequency to a two cycle per second rate. Assuming no fault condition existing on a fault input line 712, a logical 1 appears along line 712 which is coupled in turn with the output of the clock divider 710 to a gate 714, the third input of which also receives a logical 1 during this time span. The third input to the gate 714 is derived from the output of gate 716, which is in turn receiving an input from a decoding unit 718.

The function of the decoding unit is to determine the elapse of a 7½ second period, which at a two cycle per second clock input at the C input of counter $T_1$ will result in a count of 15 at the elapse of 7½ seconds. The decoder 718 is non-inverting and responds, in well known manner, to a count of 15 in the counter T1 for providing a logical 1, coupled then to the gate 716. Prior to achieving a count of 15 in counter $T_1$, a logical 1 appears at the output of gate 716 and is coupled to the input of the gate 714 as described above and also to the input of the gates 704, 719, 720 and 722.

The output of each of the counters T2 and T3 have coupled thereto decoding units 724 and 726 which act in a complementary manner with respect to decoding unit 718, achievement of a predetermined count producing a logical 0. That is to say, a count of 15 appearing in either counter unit T2 or T3 will result in a change of state of the decoder unit 724 or 726 producing a logical 0. In the absence of such count, a logical 1 appears at the output of each of the decoder units 724 and 726. Inverter unit 728 inverts the logical 1 at the output of decoder 726 to a logical 0 and feeds it back to the first input of the NAND gating unit 730. In like manner, inverter unit 742 inverts its respective decoder output and feeds it back to a first input of gate 720.

The logical 0 output of inverter unit 702 is coupled to further inverter unit 732 and the logical 1 applied to the first input of the gate 719, and the gate 722. During this time period, however, the pulse input signals received on input terminal 734 and 736, corresponding to the 1500 and 1100 cycle speed signals respectively, are coupled through the gates 719 and 722 as logical 0's at their respective outputs. Since logical 1's are applied along the respective input terminals 734 and 736 during the initial period prior to energization of either a 1500 or 1100 line, the pulse outputs of gates 719 and 722 are fed to inputs of counters T2 and T3, respectively, each of which begin counting such pulses. When either the counter unit T2 or T3 reaches a count of 15, a change in logical state from 1 to 0 occurs at the output of the decoder units 724 or 726. Upon reaching a count of 15 in either counter T2 or T3, the output of the decoder unit 724 or 726 goes from a logical 1 to a logical 0, and is then converted to a logical 1 through inverter unit 742 or 728. The signal is fed back to the input of gates 720 or 730, thereby converting the logical signal at the output of gate 720 or 730 from a 1 to a 0, respectively. As a result gate 719 or gate 722 is disabled thereby effectively uncoupling the source of pulses from terminals 734 or 736 from either of the counters T2 or T3. Thus a count of 15 is held in either counter upon a count of 15 being achieved therein.

At the end of the 7½ seconds, the decoding unit 718 decodes a count of 15 achieved in counter T1 and causes the logical output of the decoder 718 to go from 0 to 1 thereby effectively changing the output of NAND gate 716 from a 1 to a 0. The 0 signal when applied to the input of gate 714 uncouples the counter T1 from the source of clock pulses 710. As a result of the change of the state of NAND gate 716, all three counters are effectively disabled in a like manner. If counter T2 had counted 15, 1,500 pulses during this counting period, this would have meant 15, 1,500 input pulses at the 1500 terminal 734 and the resultant logic signal appearing at the output line 743 would provide a verification of that speed select signal. If, T3 had counted 15, 1,100 pulses during this counting period, this would have meant the presence of 15, 1,100 input pulses at the 1100 terminal 736 and the resultant logical signal appearing at the output line 744 would energize a corresponding control device such as a relay converting the speed of the receiving carriage to the appropriate level corresponding to the transmission. The operation is designed such that a logical 0 appearing along the output line 744 would have allowed the unit to run in its alternate speed condition. A simple relay switching control (not shown) can be employed to activate one or the other of the speed conditions, depending on the appearance or non-appearance of a signal on the line 744.

At the end of a legitimate transmission, the input terminal 762 responds to a 1 condition which sets a logic unit 764 such that the output line 766 of the logic unit 764 goes to a 0 condition, thereby producing a 1 logic condition at the output of gate 706 and inverter 768, as a result of which counter units T1, T2 and T3 are reset by the appearance of a 1 input at its R terminal. The logic unit 764 maintains this condition only momentarily, and may consist of a monostable multivibrator or an automatically reset bistable circuit.

The counters T2 and T3 thus provide a time delay function by counting at least 15 pulses prior to producing a speed selection selected signal. The value of this time delay serves to provide a more accurate verification of the speed select signal, to prevent spurious noise signals from providing an inaccurate speed select.

The logic circuit described in FIG. 5 can clearly include additional means and modes whereby detection of the various conditions necessary for the selecting and actuating of machine drives as well as other processing equipment in accordance with sequence signals received by either remote send or receive units can occur as desired. Thus, it would be within the skill of the art to provide additional inputs selecting or nonselecting various gates in response to types of fault conditions existing with this type of equipment. In addition logic signals can be received and decoded which would indicate whether the local or remote unit, in accordance with the operation, includes or does not include necessary complimentary equipment for sending or receiving speed control signals or the receipt of ready control signals.

It is noted that although specific detailed circuit configurations for the various units such as the counters, NAND gates, decoders, and inverters, as disclosed in the logic circuitry of FIG. 5, have not been given such arrangements are considered to be clearly within the skill of the art.

The foregoing description has thus described a novel apparatus for securing a successful document assurance operation between remote units as well as providing for speed selection in a time sharable circuit. As is obvious to those skilled in the art, many modifications may be made in the disclosed apparatus without departing from the spirit of the present invention.

What is claimed is:

1. In a data communication system employing at least two transceiver units, each capable of operating in either send or receive modes with respect to the other, each of said transceivers including a document scanner and a transceiver control circuit, the combination in each of said transceivers comprising:

means for selectively providing either a send or receive mode indication signal, a mode control for placing the control circuit in a first condition in response to a send mode indication signal applied to said mode control and in a second condition in response to a receive mode indication signal applied to said mode control, said circuit in said first condition responsive to an input signal received from a remote receiving transceiver unit for producing an indication that said input signal falls within a predetermined range, means responsive to said indication to enable the sending transmission, said circuit in said second condition responsive to a phasing signal received from a remote sending unit for detecting as part of said phasing signal first or second scanning speed information, and activation means responsive to said speed information for activating a corresponding speed control unit to control the speed of the document scanner.

2. The combination of claim 1 wherein said control circuit includes a detector having applied thereto a first reference potential and a second reference potential determining said predetermined range, means applying a third potential to said control circuit representative of the signal transmitted by a remote transceiver unit, said control circuit providing a first output signal where said third potential falls above the range of said first and second potential, a second output signal where said third potential lies between the range of said first and second potential, and a third output signal where said third potential is below the range of said first and second potential, and a selective discrimination circuit including said mode control and responsive to the output of said detector and to said send and receive mode indication signals for providing first and second speed information signals.

3. The combination of claim 2 wherein said control circuit includes a filter responsive to said third potential, and said detector includes a resistor divider having said first and second reference potentials applied thereacross, and having a first tap coupled to a first differential amplifier input, a second tap coupled to a second differential amplifier input, and said third reference potential coupled from said filter to a junction common to the remaining differential inputs of said first and second differential amplifier units, means connecting the output of said differential amplifier to a gating means, said gating means responsive to said second output signal for providing a signal to said selective discrimination circuit, and to said third output signal for providing a signal to said activation means.

4. The combination of claim 3 wherein said selective discrimination circuit includes a first time delay circuit of a first duration operative in response to said first condition, and a second time delay circuit of a second duration operative in response to said second condition, said first duration exceeding said second duration, said first duration extending for a time longer than an average spurious input and sufficient to provide an output in response to an input signal representative of information.

5. The combination of claim 3 wherein said filter is a three pole Paynter filter having fast time domain response.

6. The combination of claim 3 wherein said enabling means includes an input terminal responsive to said third output signal, a time delay circuit activated in response to said third output signal, said activation means producing an activation signal upon the termination of said time delay for activating a speed control unit.

7. In a data communication system employing at least two transceiver units, each capable of operating in either send or receive modes with respect to the other, each of said transceivers including a document scanner and a transceiver control circuit, the combination in each of said transceivers comprising:

means for selectively providing either a send or receive mode indication signal, a mode control for placing the control circuit in a first condition in response to a send mode indication signal applied to said mode control and in a second condition in response to a receive mode indication signal applied to said mode control, said circuit in said first condition responsive to an input signal received from a remote receiving transceiver unit for producing an indication that said input signal falls within a predetermined range, means responsive to said indication to enable the sending transmission, said circuit in said second condition responsive to a phasing signal received from a remote sending unit for detecting as part of said phasing signal first or second scanning speed information, and activation means responsive to said speed information for activating a corresponding speed control unit to control the speed of the document scanner, said activation means including a first counter responsive to said second condition for initiating a fixed duration counting period, detecting means responsive to an initial portion of said input signal for providing first and second signals corresponding to first and second scanning speed information, a second counter responsive to said first signal for initiating a count therein, a third counter responsive to said second signal for initiating a count therein, said second and third counter each having a predetermined maximum count condition, means responsive to termination of said fixed duration counting period for sampling said second and third counters, and means responsive to said second and third counter maximum count conditions for providing a signal indicative of said scanning speed.

8. The combination of claim 7 further including first gating means coupled to said second counter, second gating means coupled to said third counter, said first and second gating means each responsive to the respective second and third counter maximum count conditions for disabling the respective counter if said respective counter achieves its predetermined maximum count condition during said fixed duration counting period.

9. The combination of claim 7 wherein said control circuit includes a detector having applied thereto a first reference potential and a second reference potential determining said predetermined range, means applying a third potential to said control circuit representative of the signal transmitted by a remote transceiver unit, said control circuit providing a first output signal where said third potential falls above the range of said first and second potential, a second output signal where said third potential lies between the range of said first and second potential, and a third output signal where said third potential is below the range of said first and second potential, and a selective discrimination circuit including said mode control and responsive to the output of said detector and to said send and receive mode indication signals for providing first and second speed information signals.

10. The combination of claim 7 wherein said control circuit includes a filter responsive to said third potential, and said detector includes a resistor divider having said first and second reference potentials applied thereacross, and having a first tap coupled to a first differential amplifier input, a second tap coupled to a second differential amplifier input, and said third reference potential coupled from said filter to a junction common to the remaining differential inputs of said first and second differential amplifier units, means connecting the output of said differential amplifier to a gating means, said gating means responsive to said second output signal for providing a signal to said selective discrimination circuit, and to said third output signal for providing a signal to said activation means.

11. The combination of claim 10 wherein said selective discrimination circuit includes a first time delay circuit of a first duration operative in response to said first condition, and a second time delay circuit of a second duration operative in response to said second condition, said first duration exceeding said second duration, said first duration extending for a time longer than an average spurious input and sufficient to provide an output in response to an input signal representative of information.

12. The combination of claim 10 wherein said filter is a three pole Paynter filter having fast time domain response.

13. The combination of claim 7 wherein said second and third counters each provide a time delay in accordance with said predetermined maximum count, said time delay being sufficient to ovrcome spurious noise signals.

14. In a transceiver including a document scanner and a control circuit, the combination in said control circuit comprising means for selectively providing either a send or receive mode indication signal, a mode control for placing the control circuit in a first condition in response to a send mode indication signal applied to said mode control and in a second condition in response to a receive mode indication signal applied to said mode control, said circuit in said first condition responsive to an input signal from a remote receiver for providing a range signal when said input signal falls within a predetermined range, means responsive to said range signal to enable a sending transmission, said circuit in said second condition responsive to a phasing signal from a remote transmitter for detecting whether said phasing signal includes first or second scanning speed information, and activation means responsive to said speed information for activating a corresponding speed control unit to control the speed of said document scanner.

15. The combination of claim 14 wherein said control circuit includes a detector having applied thereto a first reference potential and a second reference potential determining said predetermined range, means applying a third potential to said control circuit representative of said input signal, said control circuit providing a first output signal where said third potential falls above the range of said first and second potential, a second output signal where said third potential lies between the range of said first and second potential, and a third output signal where said third potential is below the range of said first and second potential, and a selective discrimination circuit including said mode control and responsive to the output of said detector and to said send and receive mode indication signals for providing first and second speed information signals.

16. The combination of claim 15 wherein said control circuit includes a filter responsive to said third potential, and said detector includes a resistor divider having said first and second reference potentials applied thereacross, and having a first tap coupled to a first differential amplifier input, a second tap coupled to a second differential amplifier input, and said third reference potential coupled from said filter to a junction common to the remaining differential inputs of said first and second differential amplifier units, means connecting the output of said differential amplifier to a gating means, said gating means responsive to said second output signal for providing a signal to said selective discrimination circuit, and to said third output signal for providing a signal to said activation means.

17. The combination of claim 16 wherein said selective discrimination circuit includes a first time delay circuit of a first duration operative in response to said first condition, and a second time delay circuit of a second duration operative in response to said second condition, said first duration exceeding said second duration, said first duration extending for a time longer than an average spurious input and sufficient to provide an output in response to said input signal.

18. The combination of claim 16 wherein said filter is a three pole Paynter filter having fast time domain response.

19. The combination of claim 16 wherein said activation means includes an input terminal responsive to said third output signal, a time delay circuit activated in response to said third output signal, said activation means producing an activation signal upon the termination of said time delay for activating a speed control unit.

20. In a transceiver including a document scanner and a control circuit, the combination in said control circuit comprising means for selectively providing a send or receive mode indication signal, a mode control for placing the control circuit in a first condition in response to a send mode indication signal applied to said mode control and in a second condition in response to a receive mode indication signal applied to said mode control, said circuit in said first condition responsive to an input signal from a remote receiver for providing a range signal when said input signals falls within a predetermined range, means responsive to said range signal to enable a sending transmission, said circuit in said second condition responsive to a phasing signal from a remote transmitter for detecting whether said phasing signal includes first or second scanning speed information, and activation means responsive to said speed information for activating a corresponding speed control unit to control the speed of said document scanner, said activation means including a first counter responsive to said second condition for initiating a fixed duration counting period, detecting means responsive to an initial portion of said input signal for providing first and second signals corresponding to first and second scanning speed information, a second counter responsive to said first signal for initiating a count therein, a third counter responsive to said second signal for initiating a count therein, said second and third counter each having a predetermined maximum count condition, means responsive to termination of said fixed duration counting period for sampling said second and third counters, and means responsive to said second and third counter maximum count conditions for providing a signal indicative of either said first or said second scanning speed.

21. The combination of claim 20 further including first gating means coupled to said second counter, second gating means coupled to said third counter, said first and second gating means each responsive to the respective second and third counter maximum count conditions for disabling the respective counter if said respective counter achieves its predetermined maximum count condition during said fixed duration counting period.

22. The combination of claim 20 wherein said control circuit includes a detector having applied thereto a first reference potential and a second reference potential determining said predetermined range, means applying a third potential to said control circuit representative of said input signal, said control circuit providing a first output signal where said third potential falls above the range of said first and second potential, a second output signal where said third potential lies between the range of said first and second potential, and a third output signal where said third potential is below the range of said first and second potential, and a selective discrimination circuit including said mode control and responsive to the output of said detector and to said send and receive mode indication signals for providing said first and second scanning speed signals.

23. The combination of claim 20 wherein said control circuit includes a filter responsive to said third potential, and said detector includes a resistor divider having said first and second reference potentials applied thereacross, and having a first tap coupled to a first differential amplifier input, a second tap coupled to a second differential amplifier input, and said third reference potential coupled from said filter to a junction common to the remaining differential inputs of said first and second differential amplifier units, means connecting the output of said differential amplifier to a gating means, said gating means responsive to said second output signal for providing a signal to said selective discrimination circuit, and to said third output condition for providing a signal to said activation means.

24. The combination of claim 23 wherein said selective discrimination circuit includes a first time delay circuit of a first duration operative in response to said first condition, and a second time delay circuit of a second duration operative in response to said second condition, said first duration exceeding said second duration, said first duration extending for a time longer than an average spurious input and sufficient to provide an output in response to said input signal.

25. The combination of claim 23 wherein said filter is a three pole Paynter filter having fast time domain response.

26. The combination of claim 20 wherein said second and third counters each provide a time delay in accordance with said predetermined maximum count, said time delay being sufficient to overcome spurious noise signals.

27. A transceiver control circuit operative in either a send mode to enable transmission or a receive mode to provide a document scanner speed control signal and comprising means for selectively providing either a send or receive mode indication signal, a mode control for placing the control circuit in said send mode in response to a send mode indication signal applied to said mode control and in said receive mode in response to a receive mode indication signal applied to said mode control, said circuit in said send mode responsive to a first input signal from a remote receiver for determining the presence of a desired component therein, means responsive to the presence of said component for enabling transmission, said circuit in said receive mode responsive to a second input signal from a remote transmitter for detecting a further desired component containing scanning speed information, and providing means responsive to the detection of said further desired component for providing said document scanner speed control signal.

28. The combination of claim 27 wherein said control circuit includes a detector having applied thereto a first reference potential and a second reference potential determining a range representing said desired component, means applying a third potential to said control circuit representative of said first input signal, said control circuit providing a first output signal where said third potential falls above said range, a second output signal where said third potential lies within said range, and a third output signal where said third potential is below said range, and a selective discrimination circuit including said mode control and responsive to the output of said detector and to said send and receive mode indication signals for providing first and second speed information signals.

29. The combination of claim 28 wherein said control circuit includes a filter responsive to said third potential, and said detector includes a resistor divider having said first and second reference potentials applied thereacross, and having a first tap coupled to a first differential amplifier input, a second tap coupled to a second differential amplifier input, and said third reference potential coupled from said filter to a junction common to the remaining differential inputs of said first and second differential amplifier units, means connecting the output of said differential amplifier to a gating means responsive to said second output signal for providing a signal to said selective discrimination circuit, and to said third output signal for providing a signal to said activation means.

30. The combination of claim 29 wherein said selective discrimination circuit includes a first time delay circuit of a first duration operative in response to said first output signal, and a second time delay circuit of a second duration operative in response to said second output signal, said first duration exceeding said second duration, said first duration extending for a time longer than an average spurious input and sufficient to provide an output in response to said input signal.

31. The combination of claim 29 wherein said filter is a three pole Paynter filter having fast time domain response.

32. The combination of claim 29 wherein said providing means includes an input terminal responsive to said third output signal, a time delay circuit activated in response to said third output signal, said providing means providing said control signal upon the termination of said time delay.

33. A transceiver control circuit operative in either a send mode to enable transmission or a receive mode to provide a control signal, and comprising means for selectively providing either a send or receive mode indication signal, a mode control for placing the control circuit in said mode in response to a send mode indication signal applied to said mode control and in said receive mode in response to a receive mode indication signal applied to said mode control, said circuit in said send mode responsive to a first input signal from a remote receiver for determining the presence of a desired component therein, means responsive to the presence of said component for enabling transmission, said circuit in said receive mode responsive to a second input signal from a remote transmitter for detecting a further desired component, and providing means responsive to the detection of said further desired component for providing said control signal, said providing means including a first counter actuated when said control circuit is in said receive mode for initiating a fixed duration counting period, detecting means responsive to an initial portion of said second input signal for providing first and second signals corresponding to first and second input signal characteristics, a second counter responsive to said first signal for initiating a count therein, a third counter responsive to said second signal for initiating a count therein, said second and third counter each having a predetermined maximum count condition, means responsive to termination of said fixed duration counting period for sampling said second and third counters, and means responsive to said second and third counter maximum count conditions for providing a signal indicative of either said first or said second input signal characteristics.

34. The combination of claim 33 further including first gating means coupled to said second counter, second gating means coupled to said third counter, said first and second gating means each responsive to the respective second and third counter maximum count for disabling the respective counter if said respective counter achieves its predetermined maximum count condition during said fixed duration counting period.

35. The combination of claim 33 wherein said control circuit includes a detector having applied thereto a first reference potential and a second reference potential determining a predetermined range, means applying a third potential to said control circuit representative of said input signal, said control circuit providing a first output signal where said third potential falls above the range of said first and second potential, a second output signal where said third potential lies between the range of said first and second potential, and a third output signal where said third potential is below the range of said first and second potential, and a selective discrimination circuit including said mode control and responsive to the output of said detector and to said send and receive mode indication signals for providing said first and second characteristic signals.

36. The combination of claim 33 wherein said control circuit includes a filter responsive to said third potential and said detector includes a resistor divider having said first and second reference potentials applied thereacross, and having a first tap coupled to a first differential amplifier input, a second tap coupled to a second differential amplifier input, and said third reference potential coupled from said filter to a junction common to the remaining differential inputs of said first and second differential amplifier units, means connecting the output of said differential amplifier to a gating means, said gating means responsive to said second output signal for providing a signal to said selective discrimination circuit, and to third output signal for providing a signal to said providing means.

37. The combination of claim 36 wherein said selective discrimination circuit includes a first time delay circuit of a first duration operative in response to said first output signal, and a second time delay circuit of a second duration operative in response to said second output signal, said first duration exceeding said second duration, said first duration extending for a time longer than an average spurious input and sufficient to provide an output in response to said input signal.

38. The combination of claim 36 wherein said filter is a three pole Paynter filter having fast time domain response.

39. The combination of claim 33 wherein said second and third counters each provide a time delay in accordance with said predetermined maximum count, said time delay being sufficient to overcome spurious noise signals.

* * * * *